United States Patent
Ferlitsch

(10) Patent No.: US 7,375,837 B2
(45) Date of Patent: May 20, 2008

(54) USER-DEFINABLE PRINT-OPTION CONVERSION FOR HETEROGENEOUS CLUSTER PRINTING

(75) Inventor: Andrew R. Ferlitsch, Tigard, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 999 days.

(21) Appl. No.: 10/397,014

(22) Filed: Mar. 25, 2003

(65) Prior Publication Data

US 2004/0190032 A1 Sep. 30, 2004

(51) Int. Cl.
*G06F 15/00* (2006.01)
*H04L 9/00* (2006.01)

(52) U.S. Cl. .............. 358/1.15; 358/1.13; 399/16; 709/203; 713/160; 713/161

(58) Field of Classification Search ........... 358/1.15, 358/1.18, 1.13; 399/16; 709/203; 713/160, 713/161
See application file for complete search history.

(56) References Cited

U.S. PATENT DOCUMENTS

| | | | |
|---|---|---|---|
| 5,129,639 A * | 7/1992 | DeHority | 270/1.01 |
| 6,266,150 B1 | 7/2001 | Brossman et al. | |
| 6,823,147 B2 * | 11/2004 | Jackelen et al. | 399/16 |
| 6,865,354 B2 * | 3/2005 | Jackelen et al. | 399/81 |
| 2001/0043352 A1 | 11/2001 | Brossman et al. | |
| 2002/0112037 A1 | 8/2002 | Koss | |
| 2002/0116439 A1 | 8/2002 | Someshwar et al. | |
| 2002/0138557 A1 | 9/2002 | Mukaiyama et al. | |
| 2002/0161740 A1 | 10/2002 | Nakamura et al. | |
| 2003/0053810 A1 * | 3/2003 | Jackelen et al. | 399/16 |
| 2003/0090697 A1 * | 5/2003 | Lester et al. | 358/1.14 |
| 2003/0184782 A1 | 10/2003 | Perkins et al. | |
| 2004/0064812 A1 * | 4/2004 | Tachiyama | 717/170 |
| 2006/0256358 A1 * | 11/2006 | Chapman et al. | 358/1.13 |

* cited by examiner

*Primary Examiner*—Douglas Q. Tran
*Assistant Examiner*—Chan S Park
(74) *Attorney, Agent, or Firm*—Jon M. Dickinson, PC; Robert D. Varitz, PC

(57) ABSTRACT

A method and system for handling an imaging job in a heterogeneous imaging environment, and in particular for enabling and implementing dynamic conversion and/or configuration of imaging control data, such as print control data, so as to match imaging job requirements with the specific capabilities of a selected imaging device. Utilizing an appropriate data definitions database, which is always modifiable to suit current imaging environmental conditions, the invention deals effectively with various conversion and configuration needs, including those associated with (a) existing, (b) virtual, and (c) pseudo imaging drivers.

9 Claims, 11 Drawing Sheets

Fig. 3A

```
OPTIONS - COLLATION

#  NAME            DATA TYPE   VALUES
#  COLATE          BOOLEAN
   FaceUp          BOOLEAN
   COPIES          INTEGER     0..32767

OPTIONS - SHEET ASSEMBLY

#  NAME            DATA TYPE   VALUES
#  DUPLEX          BOOLEAN
   BINDING         ENUM        ShortEdge, LongEdge
   REVERSE         BOOLEAN
   ORIENTATION     ENUM        PORTRAIT, LANDSCAPE, ROTATED
   BOOKLET         BOOLEAN
   NUP             INTEGER     1,2,4,6,8,12,16
   FirstPageDuplex BOOLEAN
   FirstPagePaper  ENUM        LETTER, LEGAL, EXECUTIVE, A3, A4, A5, B4, B5, \
                               ENVELOPE10, ENVELOPEB4, ENVELOPEC5, 8K, 16K \
                               ENVELOPEDL, MONARCH, 11X17, EXECUTIVEJIS,\
                               TABLOID

OPTIONS - PAPER SELECTION

#  NAME            DATA TYPE   VALUES
#  PAPER           ENUM        LETTER, LEGAL, EXECUTIVE, A3, A4, A5, B4, B5, \
                               ENVELOPE10, ENVELOPEB4, ENVELOPEC5, 8K, 16K \
                               ENVELOPEDL, MONARCH, 11X17, EXECUTIVEJIS,\
   STOCK           ENUM        PLAIN, BOND, TRANSPARENCY, PREPUNCHED, RECYCLED, \
                               COLOR, LETTERHEAD, PREPRINT, LABELS, CARDSTOCK
   TRAY            ENUM        AUTO, TRAY1, TRAY2, TRAY3, TRAY4, TRAY5, LCT, \
                               MANUALFEED, ENVELOPEFEED

OPTIONS - OUTPUT TRAY

#  NAME            DATA TYPE   VALUES
#  OutBin          ENUM        AUTO, TRAY1, TRAY2, TRAY3, TRAY4, TRAY5, TRAY6, \
                               TRAY7, TRAY8, TRAY9, TRAY10, TRAY11, UPPER, \
                               MIDDLE, LOWER

OPTIONS - FINISHING

#  NAME            DATA TYPE   VALUES
#  STAPLE          ENUM        NONE, LEFT, RIGHT, 2LEFT, 2RIGHT, 3LEFT, 3RIGHT, \
                               SADDLESTITCH
   STITCH          BOOLEAN
   PUNCH           ENUM        NONE, 2HOLE, 3HOLE
   FOLD            ENUM        NONE, ShortEdge, LongEdge
```

Fig. 3B

```
OPTIONS - RENDERING

#   NAME           DATA TYPE      VALUES

    RESOLUTION     INTEGER        75, 90, 150, 180, 300, 360, 600, 720, 1200
    ECONOMODE      BOOLEAN

OPTIONS - ACCOUNTING

#   NAME           DATA TYPE      VALUES

    UserID         INTEGER        0..32767
    UserName       STRING
    AccountID      INTEGER        0..32767
    AccountName    STRING
    DRIVER         STRING
    DOCUMENT       STRING

OPTIONS - SECURED PRINTING

#   NAME           DATA TYPE      VALUES

    PIN            INTEGER        0..32767
    PASSWORD       STRING
    RETENTION      ENUM           HOLD, STORE, PROOF

OPTIONS - OTHER

#   NAME           DATA TYPE      VALUES

    PageProtect    BOOLEAN
    TIMEOUT        INTEGER        0..600
```

Fig. 4A

```
DRIVER = *

# OPTION          VALUE        COMMAND         SETTING

  COLLATE         T            COLLATE         ON
  COLLATE         F            COLLATE         OFF
  COPIES          *            COPIES          *
  DUPLEX          T            DUPLEX          ON
  DUPLEX          F            DUPLEX          OFF
  ORIENTATION     PORTRAIT     ORIENTATION     PORTRAIT
  ORIENTATION     LANDSCAPE    ORIENTATION     LANDSCAPE
  TRAY            AUTO         MEDIASOURCE     AUTO
  TRAY            TRAY1        MEDIASOURCE     TRAY1
  STAPLE          LEFT         FINISH          STAPLE

DRIVER = SHARP AR-N275, \
         SHARP AR-235,  \
         SHARP AR-275

# OPTION          VALUE        COMMAND         SETTING

  REVERSE         T            JOBORDER        REVERSEORDER
  NORMAL          F            JOBORDER        NORMALORDER
  STAPLE          NONE         JOBSTAPLE       STAPLENON
  STAPLE          LEFT         JOBSTAPLE       STAPLELEFT , \
                               OUTBIN          TRAY3
  STAPLE          RIGHT        JOBSTAPLE       STAPLERIGHT ,\
                               OUTBIN          TRAY3
  STAPLE          LEFT2        !
  STAPLE          RIGHT2       !
  STAPLE          LEFT3        !
  STAPLE          RIGHT3       !

DRIVER = SHARP AR-M450, \
         SHARP AR-M350, \
         SHARP AR-P350, \
         SHARP AR-P450

# OPTION          VALUE        COMMAND         SETTING

  REVERSE         T            JOBORDER        REVERSEORDER
  NORMAL          F            JOBORDER        NORMALORDER
  STAPLE          NONE         JOBSTAPLE       STAPLENON
  STAPLE          LEFT         JOBSTAPLE       STAPLELEFT , \
                               OUTBIN          TRAY5
  STAPLE          RIGHT        JOBSTAPLE       STAPLERIGHT ,\
                               OUTBIN          TRAY5
  STAPLE          LEFT2        !
  STAPLE          RIGHT2       !
  STAPLE          LEFT3        !
  STAPLE          RIGHT3       !
```

Fig. 4B

```
DRIVER = SHARP AR-507, \
         SHARP AR-505

#  OPTION        VALUE      COMMAND          SETTING

   REVERSE       T          JOBORDER         REVERSEORDER
   NORMAL        F          JOBORDER         NORMALORDER
   STAPLE        NONE       JOBSTAPLE        STAPLENON
   STAPLE        LEFT       JOBSTAPLE        STAPLELEFT , \
                            OUTBIN           TRAY3
   STAPLE        RIGHT      JOBSTAPLE        STAPLERIGHT ,\
                            OUTBIN           TRAY3
   STAPLE        LEFT2      JOBSTAPLE        STAPLE2LEFT , \
                            OUTBIN           TRAY3
   STAPLE        RIGHT2     JOBSTAPLE        STAPLE2RIGHT ,\
                            OUTBIN           TRAY3
   STAPLE        LEFT3      !
   STAPLE        RIGHT3     !

DRIVER = HP LaserJet 8100

#  OPTION        VALUE      COMMAND          SETTING

   STAPLE        LEFT       FINISH           STAPLE, \
                            OUTBIN           OPTIONALOUTBIN3,\
                            STAPLEOPTION     ONE
   STAPLE        RIGHT      !
   STAPLE        LEFT2      FINISH           STAPLE, \
                            OUTBIN           OPTIONALOUTBIN3,\
                            STAPLEOPTION     TWO
   STAPLE        RIGHT2     !
   STAPLE        LEFT3      FINISH           STAPLE, \
                            OUTBIN           OPTIONALOUTBIN3,\
                            STAPLEOPTION     THREE
   STAPLE        RIGHT3     !
```

USER-DEFINABLE PRINT-OPTION CONVERSION FOR HETEROGENEOUS CLUSTER PRINTING

BACKGROUND AND SUMMARY OF THE INVENTION

This invention pertains to methodology and a system for handling an imaging job, such as a printing job, with respect to the imaging of that job in a heterogeneous imaging environment, such as a cluster-printing environment, that includes a plurality of imaging devices, such as printers, which may have different, specific imaging (printing) characteristics and capabilities. In particular, the system and method of the present invention address the issue of determining and dynamically associating appropriate data structure for an imaging job, such as within the header in that imaging job, with a compatible, available imaging device in the environment. Data structure determination and association are performed so as to assure that the imaging characteristics and capabilities of a selected cluster imager substantially match the underlying imaging-capabilities requirements of the specific job which is being handled.

The terminology "print-option conversion" is employed herein as a specific-illustration identifier of the broader concept of providing dynamic configuring, including option conversion, of (a) existing, (b) virtual, and (c) pseudo imager drivers, such as a printer driver. The term "imaging" and variations thereof employed herein, is/are intended to encompass any one of (a) printing, (b) faxing, (c) scanning, (d) copying, (e) document archiving/retrieving, (f) document converting/manipulating, (g) document transferring, and (h) device managing.

According to a preferred practice of the invention with regard to a specific, existing imager driver, after an imaging job is created, the imaging command and control data structure associated with the job, typically created by that specific imager driver, is assessed, in a kind of reverse-engineering manner, to determine the underlying imaging requirements of the job. This information is then compared with information that is provided in a look-up-table-type, drivers-definitions data structure, wherein a relationship is drawn between basic imaging capabilities and the specific imaging characteristics and capabilities of essentially all of the potentially available imaging devices included in the imaging environment. Under circumstances where it is necessary to change the data structure associated with an imaging job so as to make that data structure compatible with a then-available imaging device, the appropriate data structure that relates to that available imaging device is revisedly re-written into the imaging job data structure, whereafter the imaging job is appropriately sent to that selected, compatible imaging device. It is also possible that the invention may similarly be used with respect to sending a job to two or more imaging devices.

In relation to working in the settings of virtual (configurable generic) and pseudo (direct-drive imaging) drivers, a job is initiated, imaging preferences are selected, an imaging device, or devices, is/are selected, and the appropriate driver is configured/created dynamically from data in the same kind of drivers-definitions data structure mentioned above.

All configuration practices implemented by the invention are dynamic, and all are based upon job configurations that are derived from the mentioned drivers-definitions data structure, also referred to herein as a library file.

The various important features and advantages that are offered by the present invention will become more fully apparent as the description which now follows is read in conjunction with the accompanying drawings.

DESCRIPTION OF THE DRAWINGS

FIGS. 3A and 3B illustrate user-definable imaging job options, definitions and values. FIG. 3A and 3B should be read in a manner whereby the information in FIG. 3A flows downwardly into the information presented in FIG. 3B.

FIGS. 4A and 4B illustrate user-definable imager driver definitions and settings. These two figures should be read with the information in FIG. 4A flowing downwardly into the information presented in FIG. 4B.

DETAILED DESCRIPTION OF THE INVENTION

Figure 1A:
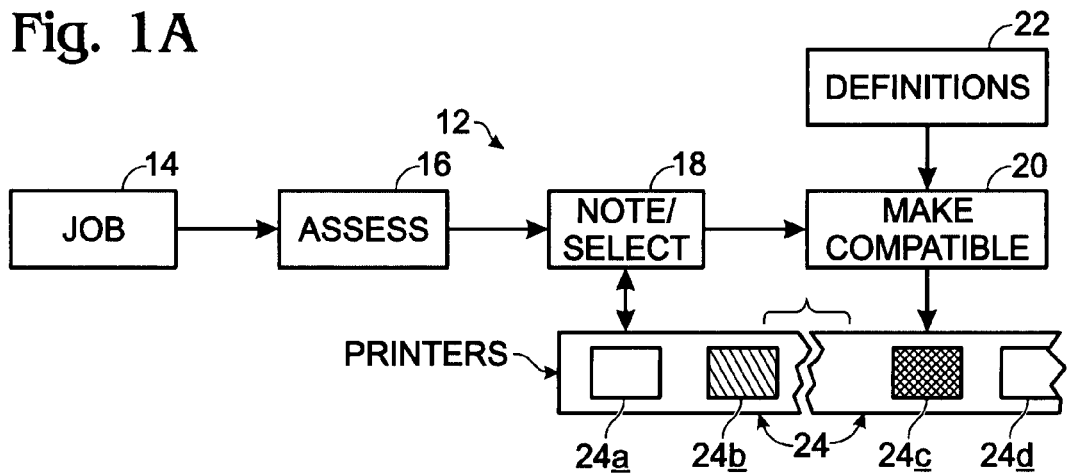
FIG. 1A is a high-level, block/schematic diagram illustrating, in an overview kind of way, a preferred and best mode embodiment and manner of practicing the present invention with respect to an imaging job which has been pre-created by an imager driver. A printing environment is employed here for illustration.
Figure 1B:
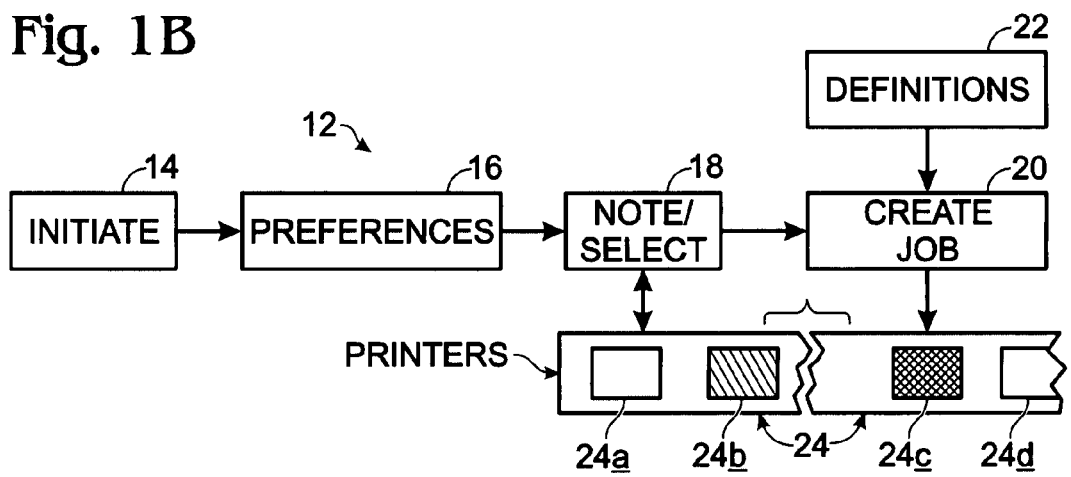
FIG. 1B is a similar, high-level, block/schematic diagram illustrating practice of the invention with regard to job creation in a printing environment employing a configurable virtual printer driver.
Figure 1C:
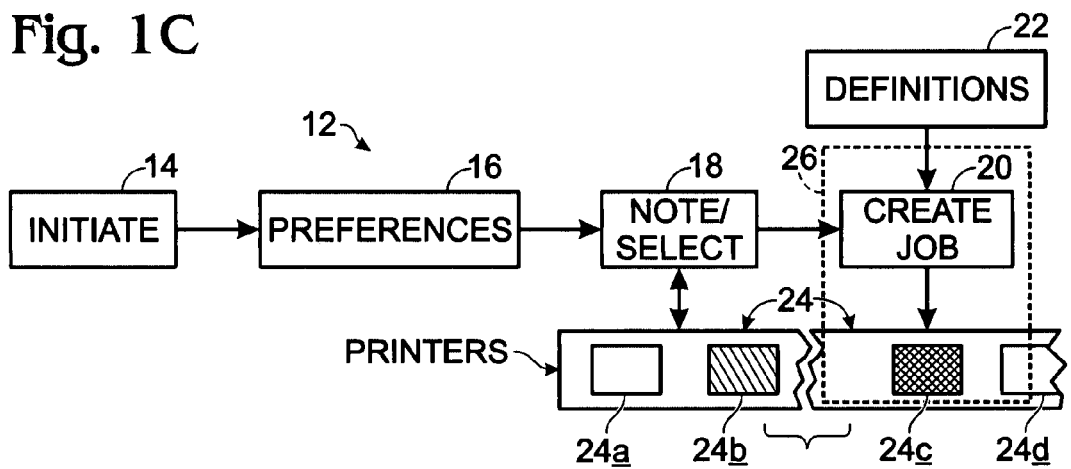
FIG. 1C is like FIGS. 1A and 1B, except here illustrating practice of the invention with respect to print-job creation employing a creatable pseudo driver for direct printing.

Directing attention now to the drawings, and with reference made first to FIGS. 1A, 1B and 1C, these three figures illustrate the system and methodology of the present invention in three different applications. From a "layout" point of view, essentially the same block arrangement exists in each of these figures. Accordingly, similarly positioned blocks in these figures are similarly numbered, though in some cases differently labeled in accordance with different specific system characteristics.

Each layout thus illustrates a specific system and methodology 12 which includes blocks 14, 16, 18, 20, 22, 24. The layout pictured in FIG. 1C additionally includes a dashed-outline block 26. These blocks are operatively interconnected similarly by single- and double-headed arrows, and the meanings and functionalities of these interconnections in the different systems will be explained shortly. Pictured within each of fragmented blocks 24 are four sub-blocks, 24a, 24b, 24c, 24d, with sub-blocks 24b, 24c in each block 24 being differently shaded. The reason for this shading, and for shading differentiation, will be discussed shortly. Each block 24 represents a heterogeneous collection of printers, and the sub-blocks therein represent different, individual printers, or printing devices.

Focusing now on FIG. 1A, Block 14 represents a pre-created print job that is compatible with some pre-known printing (imaging) device. Block 16 represents structure, and a series of method steps (likenable to reverse engineering) performed by that structure, involving assessing the printing-capabilities requirements of job 14. Block 18 functions to note devices in block 24, and to select an available device, or plural devices, for specific use to handle job 14. Devices 24b, 24c are differently darkened by shading to indicate two different representative illustrations of being selected for use. Device 24c, the darker one of the two shaded devices, is employed (so darkened) to illustrate selection of a single printer to handle job 14. Shaded device 24b is employed (so darkened differently), along with device 24c, to illustrate selection of plural (namely two) printers to handle the job.

Continuing this description in the setting of selection of but a single printing device to handle job 14, block 18 also functions to determine the specific printing-capabilities characteristics of a selected printing device (device 24c), and then "hands off" control to block 20 which, in accordance with practice of the present invention, functions to assure compatibility between the print-control data structure provided for job 14, and the noted printing-capabilities characteristics of selected printer 24c.

If there is an incompatibility between the pre-created job's print-control data structure and the printing characteristics of a selected, "available" printer, such as printer 24c, block 20 draws dynamically upon data from a prepared table of printer-driver definition data which is made available, in accordance with a key feature of the invention, from block 22. Specifically, block 20 performs a dynamic conversion in the job header for job 14 to replace the pre-created print-control data structure therein with data structure which will properly utilize printer 24c.

Further details regarding this brief structural and functional description relating to FIG. 1A will be presented later herein in a discussion focusing on FIG. 2. Before that, however, FIGS. 1B and 1C are here discussed.

Whereas FIG. 1A illustrates employment of the present invention in a printing system with respect to handling, and if necessary performing a "conversion" in relation to, a pre-created print job, FIG. 1B illustrates another kind of employment—here in a printing system wherein a print job is "initiated and fully created" in the context of utilizing a virtual, or generic, printer driver. In this arrangement, the virtual driver resides in the system as a template which is ready for device-specific configuring. No conversion of the kind described above in relation to FIG. 1A is involved.

Thus, here block 14 represents job initiation, followed by the setting of certain selected conventional job preferences in block 16. Block 18 again performs a noting and printing-device selecting function based upon the work performed by blocks 14, 16. An appropriate available printer, or printers, is/are identified and selected, and then, with the aid of driver-definitions data drawn from block 22, an appropriate virtual driver is configured in block 20, effectively "creating" the intended job with the appropriate print-control data structure(s) for the selected printer(s). Again, the definitional data content resident in block 22 plays a key role in this "on-the-fly", dynamic creation of a job which, as a consequence, will be well handled by the selected printer(s).

FIG. 1C illustrates performance of the invention in another kind of job-creating system—namely, one which utilizes a pseudo driver for direct printing in a printing device. Blocks 14, 16 and 18 perform substantially as described above in relation to FIG. 1B, except that here, job information flowing to block 20 is typically structured in a native-language format, such as Microsoft Word®. Block 20, acting (a) either as an "external", independent instrumentality in collaboration with block 22, or (b) as a "cooperator" in a responsibility-sharing arrangement with structure and software in selected printer 24c (see dashed block 26), or (c) even perhaps as an internal instrumentality within printer 24c, dynamically configures a job in association with a pseudo driver for proper handling by printer 24c. Once again, block 22 plays a key role in the behavior of this version of the invention.

Figure 2:
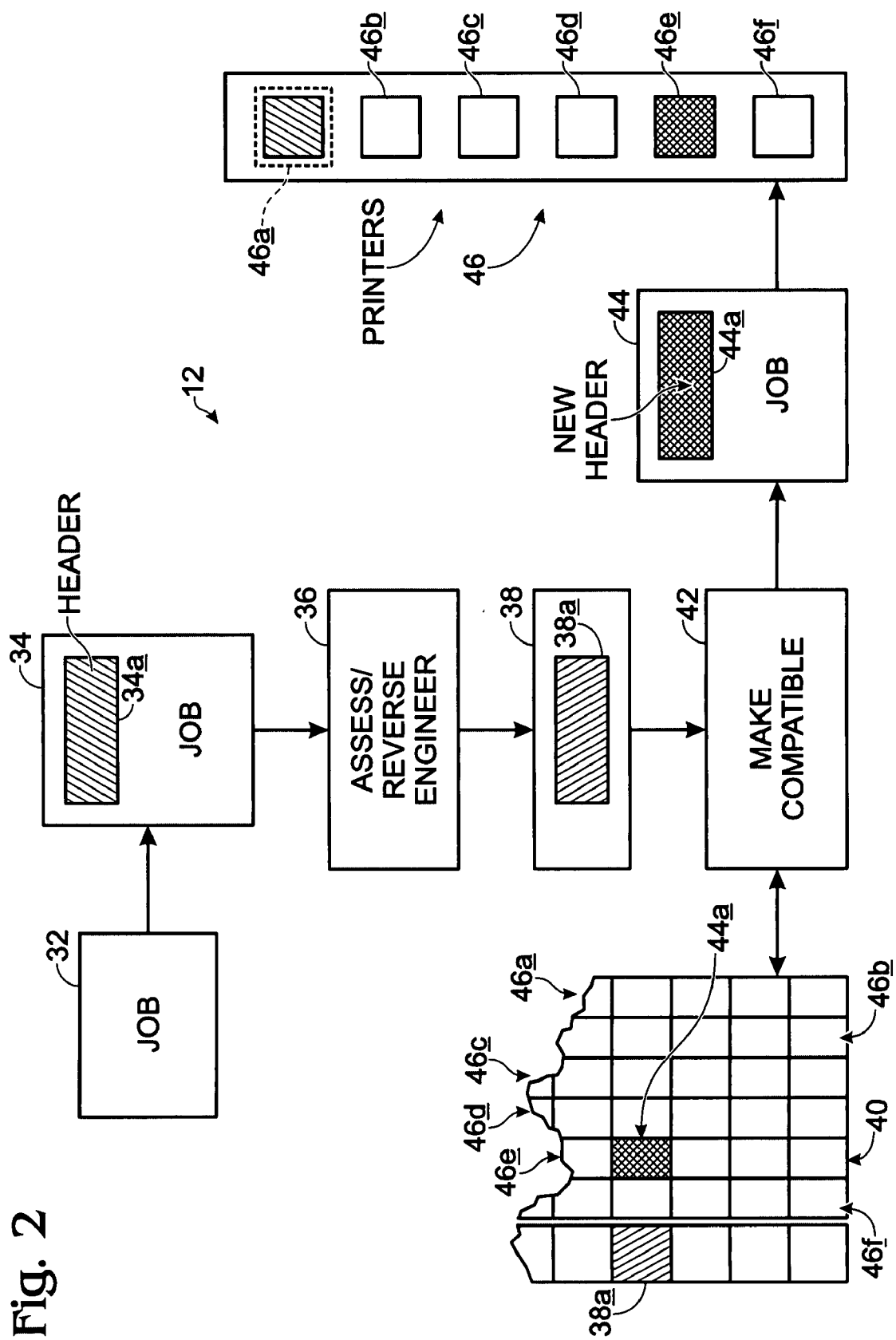
FIG. 2 is a somewhat more detailed block/schematic representation of a system and method which are constructed, and which function, in accordance with the arrangement pictured in FIG. 1A.

With attention turned now to FIG. 2, eight blocks are employed herein to illustrate a specific operation of system 12 of the invention, and in particular, the operation earlier described in conjunction with FIG. 1A. These eight blocks are identified with the numbers 32, 34, 36, 38, 40, 42, 44 and 46.

In FIG. 2, a pre-created print job is represented by block 32 (also referred to herein as job 32). Block 32 in FIG. 2 corresponds to block 14 in FIG. 1A. The preconfiguration of job 32 is represented by block 34, and this preconfiguration includes a job header 34a which is cross-hatched in FIG. 2 to symbolize a particular data-structure content that associates it with one of the several printing devices that are available at different times for use in system 12. Block 46 represents a cluster of these potentially available printing devices, and within this block six printing devices, 46a, 46b, 46c, 46d, 46e, 46f, are represented by square-marked areas. Here it will be noticed that printing device 46a is outlined with dashed lines, and contains shading that is the same as the shading which is employed in job header 34a. This shading similarity, thus employed, is provided to illustrate herein that job 34 has been created with header data structure that is aimed directly for printing compatibility with printing device 46a. However, device 46a is not currently available, and this is represented by the surrounding dashed outline provided in FIG. 2 regarding this device. Of the five other printing devices, devices 46b, 46c, 46d, 46f are either (a) not currently available, (b) not compatible with job header 34a, or (c) both. Printing device 46e, however, is available, and possesses printing-device characteristics that are symbolized the particular, dark, cross-hatched shading employed for it in FIG. 2.

Block 36, which corresponds to block 16 in FIG. 1A, and which is also referred to herein as first structure, performs an examination and an assessment of job 34, and specifically looks at header 34a to determine the nature of the underlying job requirements that are specified in that header data structure. As was briefly mentioned earlier, this operation within block 36 is somewhat like a reverse-engineering operation.

The output from block 36 is represented in block 38 with a rectangle inside it which is shaded with a different character of shading than that employed in header 34a. This differential shading is employed here to represent the fact that block 36 has appropriately identified the core imaging requirements that were specified in header 34a. Whereas header 34a is written with an expression that makes it "specific" to currently unavailable printing device 46a, what block 38 is presented with is a data expression which describes "in a general sense" the underlying requirements of job 34.

Block 40, which corresponds to block 20 in FIG. 1A, is also referred to herein as second structure. Its operation in the context of FIG. 2, will be discussed shortly.

Turning next here to block 42 which corresponds to block 22 in FIG. 1A, this block, also referred to herein as third structure, represents a library of data (definitions) which takes the form preferably of a look-up table. In this table, fundamental job characteristics of an imaging job, such as print job 34*a*, are expressed relationally with appropriate data sets, or components, that describe command and control information which is specific, individually to the potentially available printing devices that form part of system 12. The left vertical column in block 42 represents non-device-specific, fundamental and commonly expressed and understood data structure regarding printing and other control commands. To the right of the two, closely spaced vertical lines in block 42 are plural, vertical columns which represent device-specific printing and other control commands that are in the form of job header data, such as is represented by shaded job-header 34*a*.

What occurs now is that blocks 38 and 40, working in conjunction with block 42, determine that printing device 46*e* is available, and has certain printing capabilities which will be appropriate for handling the fundamental printing requirements that have just been detected (by operation of block 36) for job 34. With this determination made, block 42 operates dynamically, in any appropriate manner, and by drawing "conversion" data from block 40, to re-write the job header for job 34, thus creating a re-written, or converted, print job, represented by block 44. Block, or job, 44 now stands as a surrogate for job 34, and is armed with a header 44*a* that is configured to be appropriate and compatible with respect to available printing device 46*e*.

Further describing this process, within the illustration of block 40 in FIG. 2, one will notice that there is a sub-region marked 38*a*, and another sub-region pointed-to by two arrows marked, respectively, 46*e* and 44*a*. Sub-region 38*a* is shaded as is its counterpart "rectangle" within block 38, and the other mentioned sub-region in block 40 is shaded as within the square which represents printer 46*e*. It is this graphically depicted relationship between these two sub-regions inside block 40 that highlights the way in which, according to practice of the present invention, the "conversion" now being described takes place. Following conversion, the job is sent to device 46*e* for printing.

FIGS. 3A-10, inclusive, illustrate in greater detail various features and operations of the system and method of this invention. Read now in conjunction with just-described FIGS. 1A, 1B, 1C and 2 in the drawings, all of these figures collectively present enough information, and at an appropriate level, to convey graphically to those skilled in the relevant art, a complete and detailed description both of the system and of the method of this invention. Accordingly, description of the invention now progresses serially through FIGS. 3A-10, inclusive. With regard to these drawing figures, the more general references to imaging and imagers will be employed.

With the practice of the present invention, imagers with compatible capabilities, but with incompatible PJL syntax and/or PJL interpretation, are able to share imaging data, and/or imaging data generation devices, amongst themselves through the use of a user definable imager driver/model definition and conversion file.

This file consists of at least two parts:
1. Definition and Value Ranges of Supported Imager Options (FIGS. 3A and 3B).
2. Definition and Settings of Supported Imager Drivers (FIGS. 4A and 4B).

Description begins with FIGS. 3A and 3B which illustrate definitions and value ranges of supported imager options. The form and syntax used in this description are merely illustrative. In this illustration, imaging job options are grouped into common categories. Below are examples of categories of imaging options that are currently common in the imaging industry:
1. Collation
2. Sheet Assembly
3. Paper Selection
4. Output Trays
5. Finishing
6. Rendering
7. Accounting
8. Security For each category, one or more imaging options is/are defined. Because the imaging options are simply names and not predefines, this area of interest supports the addition of future imaging options that may become available For each imaging option defined, the definition consists of a name, a data type and an optional range.

Examples of data types are:

| | |
|---|---|
| 1. Boolean | TRUE or FALSE |
| 2. Integer | Integer Numerical Value |
| 3. String | Variable Length Character String |
| 4. Enum | List of Symbol Name Values |

For Integer data types, the definition may optionally include a range. For example, 0.32767 might be specified to denote a range of any signed short (16-bit) integer value, or 1, 2, 4, 8 for a list of sequence integer values. For enumerated data types, a definition requires specifying a list of symbol names that fully enumerate the range. For example, Portrait, Landscape and Rotated might be used to enumerate the range of values for Orientation.

Below is an example of definitions of imaging options for each of the above data types:

| | | |
|---|---|---|
| Collate | Boolean | |
| Copies | integer | 0 . . . 32767 |
| Username | string | |
| Orientation | enum | Portrait, Landscape, Rotated. |

In the examples specified, # symbol is used to designate a comment line and backslash to designate line continuation.

FIGS. 4A and 4B illustrate and describe the definitions and settings of supported imager drivers. It is assumed that each imager model has a unique imager driver associated with it, and can be distinguished by the driver name associated with the installed imager. As an alternative, definitions and settings may be specified for imager models as well. The form and syntax used in this description are also merely illustrative.

In this illustration, imager driver definitions and settings, or subsets of the same, are grouped into compatible imager drivers. For example, a line of imager models may consist of three imagers with exactly the same options, firmware interpreter and capabilities, and only differ by speed (i.e., PPM). In this case, it would be assumed that the three imager drivers could be grouped into a single common definition/setting.

In another example, if the same three imager models additionally differed in syntax and interpretation of finishing options, the finishing options could be separately specified on a per-imager-driver basis, and the remaining definitions/settings could be grouped as described above. Below is an example:

Driver=*
   # Industry Standard Definitions/Settings common to Imager Drivers unless otherwise overridden
Driver=DriverA, DriverB, DriverC
   # Definitions/Settings common to these Imager Drivers.
Driver=DriverA
   # Definitions/Settings specific to Imager Driver A.
Driver=DriverB
   # Definitions/Settings specific to Imager Driver B.
Driver=DriverC
   # Definitions/Settings specific to Imager Driver C.

One set of options that are common to most advance-featured imagers and MFP devices are finishing options for stapling. The setting and interpretation of stapling is not standardized in the industry, and is proprietary to each manufacturer.

The PJL industry standard for stapling only specifies whether to staple or not, as shown below:

| @PJL FINISH=NONE | # No Stapling |
| @PJL FINISH=STAPLE | # Stapling |

The definition and settings for the PJL industry standard for stapling might be as illustrated hereinbelow:

| Driver = * | | | |
| | Staple None | FINISH | NONE |
| | Staple Left | FINISH | STAPLE |

As noted, the PJL industry standard for stapling does not specify either where to staple, or the number of staples to use. Many modern finishers support multiple staples or multiple staple locations. Below are examples of imager models with finisher attachments that support multiple staples and/or multiple locations:

| Sharp AR-335/336/337, AR-405/407, AR-505/507 | -3 Tray Finisher -Multi-Staple/Multi-Location |
| Sharp AR-235/275/N275 | -2 Tray Finisher -Single-Staple/Multi-Location |
| Sharp AR-P350/M350/P450/M450 | -3 Tray Finisher -Single-Staple/Multi-Location |
| HP LaserJet 8100 Series | -Stapler Finisher -Multi-Staple/Single-Location |

In the above imager models, stapling consists of at least two PJL statements—one specifying the stapling output tray, and the other specifying the type of stapling. For example, the above Sharp imagers all specify an output tray that corresponds to the stapler tray in their respective finisher attachment:

| Sharp AR-335/336/337, AR-405/407, AR-505/507 | OUTBIN= TRAY3 |
| Sharp AR-235/275/N275 | OUTBIN= TRAY3 |
| Sharp AP-P350/M350/P450/M450 | OUTBIN= TRAY5 |

Thus, here one sees an example of an incompatibility amongst imagers from the same manufacturer, where the first two imager model lines use TRAY3 as the stapling output tray, and the third imager model line uses TRAY5. If an imaging job is generated from an imager driver associated with the first two imager model lines, but sent to a imager in the third model line, the imaging job would incorrectly not staple, since TRAY3 is not the stapling tray.

There are also inconsistencies amongst manufacturers regarding the PJL statement to specify the output stapling bin. For example, the HP LaserJet 8100 series imager uses a different PJL operand to refer to the output tray as the stapling output tray:
   HP LaserJet 8100 Series—OUTBIN=OPTIONALOUTBIN3

In the above Sharp imager model lines, the type of stapling is specified by the JOBSTAPLE command:
   JOBSTAPLE=STAPLELEFT
   JOBSTAPLE=STAPLERIGHT
   JOBSTAPLE=STAPLELEFT2
   JOBSTAPLE=STAPLERIGHT2

In the above examples, the @PJL SET JOBSTAPLE command is used to specify the location and number of staples. The above Sharp imager models are also incompatible with the number of staples that their corresponding finishers support:

| Sharp AR-335/S36/337, AR-405/407, AR-505/507 | 1 or 2 Staples |
| Sharp AR-2S5/275/N275 | 1 Staple |
| Sharp AR-P350/M350/P450/M450 | 1 Staple |

There are also inconsistencies amongst manufacturers on the PJL statement to specify the location and number of staples. While the above Sharp imager models use one PJL command to specify both location and number of staples, the HP LaserJet 8100 series uses two commands—one to designate stapling, and one to designate the number of staples to use:
   FINISH=STAPLE
   STAPLEOPTION=ONE
   STAPLEOPTION=TWO
   STAPLEOPTION=THREE
   STAPLEOPTION=SIX As a reflection on the picture presented by the above definitions/settings illustration and discussion, the specifications of imaging job options/values and of imager driver options/settings are presented in a human readable text file. Because the text file is human readable, this file can be updated and maintained on the fly by appropriate people. Corrections, or additions regarding new imaging job option/settings, or imager driver/model options/settings, can be added dynamically without going back to a manufacturer.

Definitions can be loaded into a cluster solution either as interpreted data, or as pre-compiled binary data. In the case of interpreted data, a cluster solution parses/interprets and converts the text file into binary data that is loaded into the cluster solution at run-time (i.e., imaging job initiation).

Alternately, a cluster solution can pre-compile the text file, and store the compiled data as a binary file. The cluster solution then reads in the binary data at run-time (i.e., imaging job initiation).

When an imaging job is generated by a imager driver, and then directed to a different, but otherwise compatible imager, a cluster solution would perform the following steps:
1. Parse the Imaging Job data for PJL statements.
2. Match PJL statements in the Imaging Job to imaging job options/settings in the definition file.
3. Match the imaging job options/settings of the parsed PJL statements to the imager driver options/settings of the source imager driver.
4. Match the imaging job options/settings of the source imager driver to the imaging driver options/settings of the targeted imager model.
5. Check for supported imaging job options/settings.
6. Convert any imager model specific option/settings that differ between the source imager driver and the targeted imager model.
7. Send the converted Imaging Job to the targeted imager model.

Below are some examples using the finisher stapling option to illustrate the above.

EXAMPLE

| Imaging Job Option | Sharp AR-507 Imager Driver | Sharp AR-N275 |
|---|---|---|
| Stapling, Left-side, 1 staple | JOBSTAPLE=STAPLELEFT OUTBIN= TRAY3 | JOBSTAPLE=STAPLELEFT OUTBIN= TRAY3 |

In this example, the options/settings for both the source imager driver and for the targeted imager model are identical. No change would be made.

EXAMPLE

| Imaging Job Option | Sharp AR-507 Imager Driver | Sharp AR-N275 |
|---|---|---|
| Stapling, Left-side, 2 staples | JOBSTAPLE=STAPLELEFT OUTBIN= TRAY3 | ! |

In this second example, the option/settings for the targeted imager model do not support stapling with two staples. No conversion can occur and the imaging job would not be redirected to this imager model.

EXAMPLE

| Imaging Job Option | Sharp AR-507 Imager Driver | Sharp AR-M450 |
|---|---|---|
| Stapling, Left-side, 1 staple | JOBSTAPLE=STAPLELEFT OUTBIN= TRAY3 | JOBSTAPLE=STAPLELEFT OUTBIN= TRAY5 |

In the above example, the options/settings for both the source imager driver and targeted imager model differ only by the output tray. The OUTBIN=TRAY3 statement in the imaging job would be converted to OUTBIN=TRAY5 when sent to the targeted imager model.

EXAMPLE

| Imaging Job Option | Sharp AR-507 Imager Driver | HP LaserJet 8100 |
|---|---|---|
| Stapling, Left-side, 1 staple | JOBSTAPLE=STAPLELEFT OUTBIN= TRAY3 | FINISH=STAPLE OUTBIN= OPTIONALOUTBIN3 STAPLEOPTION=ONE |

In the above example, the options/settings for both the source imager driver and targeted imager model differ significantly. In this case, the imaging job would be converted as follows:
1. OUTBIN=TRAY3 would be changed to OUTBIN=OPTIONALOUTBIN3
2. JOBSTAPLE=STAPLELEFT would be changed to FINISH=STAPLE
3. STAPLEOPTION=ONE would be added.

Continuing now with more commentary regarding various definition situations and thoughts, from a general layout point of view, a user-definable imager definition file is normally composed of a sequence of one or more sections. Each section describes a grouping of one or more imager drivers and associated imager models that have similar characteristics, such as being from the same model line. The characteristics need not be identical, but just similar enough to be described together in a section. Generally, this is defined as having the same configurable capabilities (e.g., duplex), but perhaps differing in attributes (e.g., PPM).

Each section is denoted by left and right brackets and has a user definable name. A section is broken down into components. A component is a predefined subsection that has a specific meaning, which is preceded by a % symbol and followed by a predefined keyword. Below is an example of the general layout, wherein one will note that the # symbol denotes a line comment:

| [NAME] | # Start of a Section |
|---|---|
| % Model | # Imager Models are declared here |
| % Driver | # Imager Drivers are declared here |
| % Attribute | # Imager Model attributes are defined here |
| % Option | # Imager Model/Driver options are defined here |
| % Protocol | # Imager Model communication and PDL protocols defined here |
| % Notification | # Imager Model notification methods are defined here |

With respect to defining imager models and imager drivers, the imager definition file usually contains component subsections to declare the imager drivers and associated imager models within a common section. Generally, an imager model may accept more than one PDL, but an imager driver generally only generates a single PDL. To accommodate this, each imager driver can optionally be declared with the PDL that it generates.

Generally, imager models in a common section, such as from an imager model line, have certain varying attributes or capabilities. To accommodate this, each imager model can optionally be declared with an enumeration identifier, which can then be later used to differentiate attributes/capabilities that are supported with which models. Below is an example of declaring a set of imager drivers and imager models within a common section:

| I [NAME] # Section Name | |
|---|---|
| % Model | |
| Imager Model AR-1 = | 1 # Enumerated ID for this Model is 1 |
| Imager Model AR-2 = | 2 |
| Imager Model AR-3 = | 3 |
| Imager Model AR-N = | N |
| % Driver | |
| Imager Driver AR-1 | PCL 5e # The PDL generated here is PCL 5e |
| Imager Driver AR-2 | Postscript |
| Imager Driver AR-3 | PCL 5e |
| Imager Driver AR-N | Postscript |

Further, the imager driver declarations can be segmented for multiple imager model groupings, where each grouping of imager drivers can be interchanged with any of the corresponding imager models. If no grouping is specified, then all imager drivers are assumed to be interchangeable with the imager models. The groupings are specified in a parenthesized list using the enumerated IDs of the imager models.

Below is an example:

| % Model | |
|---|---|
| Imager Model AR-1 = | 1 # Enumerated ID for this Model is 1 |
| Imager Model AR-2 = | 2 |
| % Driver | |
| Imager Driver AR-1 PCL 5e | PCL Se (1) # use with AR-1 |
| Imager Driver AR-1 PS | Postscript (1) # use with AR-1 |
| Imager Driver AR-2 | Postscript (2) # use with AR-2 |

In relation to defining attributes in an imager definition file, such a file will contain a component subsection to define the attributes of the imager models declared in the corresponding section. Attributes are characteristics of an imager model that are not modifiable or selectable by the imaging source. Attributes generally include, but are not limited to:
 1. PPM—imager rate
 2. imagable Area—region of paper that ink can be placed on
 3. Color—imager has color capabilities
 4. Maximum Output Capacity—maximum number of sheets in output tray The attribute section contains zero or more attribute definitions. Generally, each attribute is declared, followed by its definition. In this example, the declaration consists of the name of the attribute followed by a colon. The definition consists of the text that follows the colon on the same line.

In the next-below example, definition information can include:
 Is the attribute supported
 Data Type of the attribute
 Attribute Value The above definitions can be segmented for multiple imager model groupings, where each grouping shares the same attributes. If no grouping is specified, then all imager models share the same attributes. In this situation, groupings are separated by commas, and the associated imager models are specified in a parenthesized list using the enumerated IDs of the imager models. Below is an example of defining a set of imager attributes for a set of imager models within a common section:

| [NAME] | # Section Name |
|---|---|
| % Model 7 | |
| Imager Model AR-1 = | 1 # Enumerated ID for this Model is 1 |
| Imager Model AR-2 = | 2 |
| Imager Model AR-3 = | 3 |
| . . . | |
| Imager Model AR-N = | N |
| % Attribute | |
| Color: no | # Color is not supported on these imagers |
| OutputCapacity: integer 500 | # maximum output capacity is 500 sheets |
| PPM: integer 20(1, 2), 35(3. . .N) | # PPM is 20 for models AR-1/AR-2 and 35 # for all the remaining models. |

From discussion and illustrations presented so far, it is understood that imager definition file can contain a component subsection to define the imaging options of the imager models and associated drivers declared in the corresponding section.

Options are user selectable settings implemented either by the imager firmware or by the imager driver, and may be optionally installed.

Imager options generally include:
 1. Collation
 2. Sheet Assembly
 3. Paper Selection
 4. Output Trays
 5. Finishing
 6. Rendering
 7. Accounting
 8. Security The option section contains zero or more option definitions. Generally, each option is declared, followed by its definition. In this example, the declaration consists of the name of the option followed by a colon. The definition consists of two parts, a part that consists of the text that follows the colon on the same line, and a second part that consists of a sequence of option selections and their corresponding PJL commands.

The first part specifies where the option is implemented, and whether the option is an installable option (i.e., implemented in the imager, but is not standard). The option can be specified as either implemented in the imager firmware (or attachment) or imager driver. For example, duplexing is generally implemented in the imager firmware, stapling in a finisher attachment, but copy collation and booklet imaging may be emulated in the imager driver, if the imager model does not have the storage capacity for these types of operations.

Below is an example of declaring a set of imager options and defining the implementation location for a set of imager models within a common section:

| [NAME] | # Section Name |
|---|---|
| % Model | |
| Imager Model AR-1 = | 1 # Enumerated ID for this Model is 1 |
| ... | |
| Imager Model AR-N = | N |
| % Driver | |
| Imager Driver AR-1: | PCL 5e |
| ... | |
| Imager Driver AR-N: | Postscript |
| % Option | |
| Duplex: Imager | # Duplex is standard in the imager |
| Stapling: Imager Install | # Stapling is optional configuration in imager |
| Collation: Driver | # Collation is emulated in the driver |

The second portion of the option declaration consists of a sequence of zero or more user selectable option settings and their corresponding PJL commands. Each option selection consists of a tag name followed by zero or more PJL commands. In this example, the tag name is enclosed between angle brackets, and the PJL commands consists of zero or more commands—one per line, preceded by an @ sign.

Below is an example of defining the imager option for duplex mode imaging:

Duplex: Imager
<SIMPLEX>
@PJL SET DUPLEX=OFF
<LONGEDGE>
@PJL SET DUPLEX=ON
@PJL SET BINDING=LONGEDGE
@PJL SET OUTTRAY=TRAY1
<SHORTEDGE>
@PJL SET DUPLEX=ON
@PJL SET BINDING=SHORTEDGE
@PJL SET OUTTRAY=TRAY1

In the above illustration, there are three user settings for duplex: simplex, longedge (duplex in book format) and shortedge (duplex in tablet format). The @PJL statements following each option selection indicate the PJL statements generated by the corresponding drivers and the associated imager models in this section.

Note, some option selections may require more than one statement. In the above case, duplex on requires setting the binding edge option to determine the page orientation and the output tray to indicate which path in the imager has duplex capabilities.

From a "protocols" point of view, an imager definition file contains a component subsection to define the protocols supported by selected imager models. Protocols include imager port protocols, such as LPR and TCP/IP, device-query protocols, such as Bi-Di, SNMP and IPP, and imaging languages, such as PJL, PCL 5e, Postscript, etc.

The protocol section contains zero or more protocol definitions. Generally, each protocol is declared, followed by its definition. In this example, the declaration consists of the name of the type of protocol followed by a colon. The definition consists of a sequence of zero or more protocol names that follow(s) the colon on the same line.

Additionally, imager protocol declarations can be further annotated, using the=sign, to indicate the supported version level of the protocol. Below is an example:

% Protocol
Port: LPR, TCP/IP, AppleTalk, IEEE 1284=ECP
Query: SNMP=v3, SLP
PDL: Postscript=v2, PCL 5e, PCL XL As an alternative, an imager definition file could have the means to describe proprietary fields that are extensions to these protocols, such as Extended MIB on a per imager model basis for SNMP.

Regarding the issue of notification, an imager definition file can contain a component subsection to define the methods for notifying the imaging source of job completion which may be supported by certain imager models. Job Completion includes imaging phases such as:

1. De-spooling—Imaging Job was fully de-spooled to/from the imaging device.
2. Internal Queuing—Imaging Job was successfully queued in the imaging device.
3. RIP—Imaging Job was fully RIP processed.
4. Output—Imaging Job was fully physically outputted The notification section contains zero or more notification definitions. Generally, each notification is declared, followed by its definition. In this example, a declaration consists of the name of the type of notification followed by a colon. The definition consists of the name of the notification that follows the colon on the same line.

Below is an example.
% Notification
De-spool: Spooler
Queue:
RIP: Spooler
Output: email In the above example, the definition indicates that the imager model announces successfully completion of both the de-spooling and RIP back to the Spooler (e.g., EndDocImager( )), there is no indication of queuing (e.g., no queue capabilities), and completion of physical output is notified by email.

With reference to the matter of capabilities matching, in one approach, the imager definition file is used to facilitate capabilities matching in an imager group for imager pooling or job splitting. In this approach, all the imagers are assumed to:

1. Accept the same imaging job stream (i.e., compatible PJL and PDL), such as in a common imager model line.
2. But have different capabilities, standard and/or installed options.
3. And may be in different states: error, ready, offline, etc.

Generally, the imaging job is directed to the lead imager (e.g., Imager A) in the imager group, and the imaging job stream is generated by the imaging source to be compatible with the lead imager. Prior to transmitting the imaging job to the imaging device, the imaging job is sent to a control unit where that control unit may be part of the imaging subsystem. It could be in the spooler, in the imaging processor, in the port monitor, or in the imaging assist, and may reside on the client, at the server, or with a third-party component which is added between the client and the imaging device, or built into the imaging device.

The control unit analyzes the imaging job to determine the imaging requirements, such as by parsing the PJL commands that generally precede the imaging data. The imaging requirements (e.g., List of PJL commands) are passed to a capabilities matching unit. The capabilities matching unit is used to match the requirements of the imaging job to one or more imagers in the imager group using any conventional best-fit algorithm, such as, but not limited to: availability, imaging rate and capabilities.

The capabilities matching unit uses the imager definition file described herein to improve the performance and reliability of determining the capabilities of each imager in the imager group. Instead of querying each imager for either all the imager's capabilities, or the subset required by the imaging job, the capabilities unit queries an imager database that was constructed from the imager definition file.

For each imager, the capabilities matching unit queries the imager database using the imager model name of the corresponding imager. Any method may be used to determine the model name of the corresponding imager, such as by an SNMP query. The imager database, generated by the imager definition file, returns to the capabilities matching unit a list of the corresponding imager's standard features, installable features and methods of communication. The imager database may also contain a cache to return information on installable features that were obtained previously.

The capabilities matching unit then uses this information to determine the minimum, if any, amount of information to query from the imaging devices to complete the matching algorithm. If the feature is an installable option, the capabilities matching unit may additionally store the result in a cache that can be subsequently accessed by the imager database in future queries.

When a capability is an installed feature, and there is no information, or is stale, from the cache, the capabilities matching unit uses the communication method(s) obtained from the imager database to query the imaging device. If the imaging device does not respond, the imaging device can be assumed to be non-communicating, vs. not supporting the protocol.

Once the capabilities of the imaging devices are determined, relative to the requirements of an imaging job, the capabilities matching unit passes to the control unit the best-fit imager(s). The control unit then de-spools the imaging job to one, or a subset of, the matched imager(s).

Figure 5:
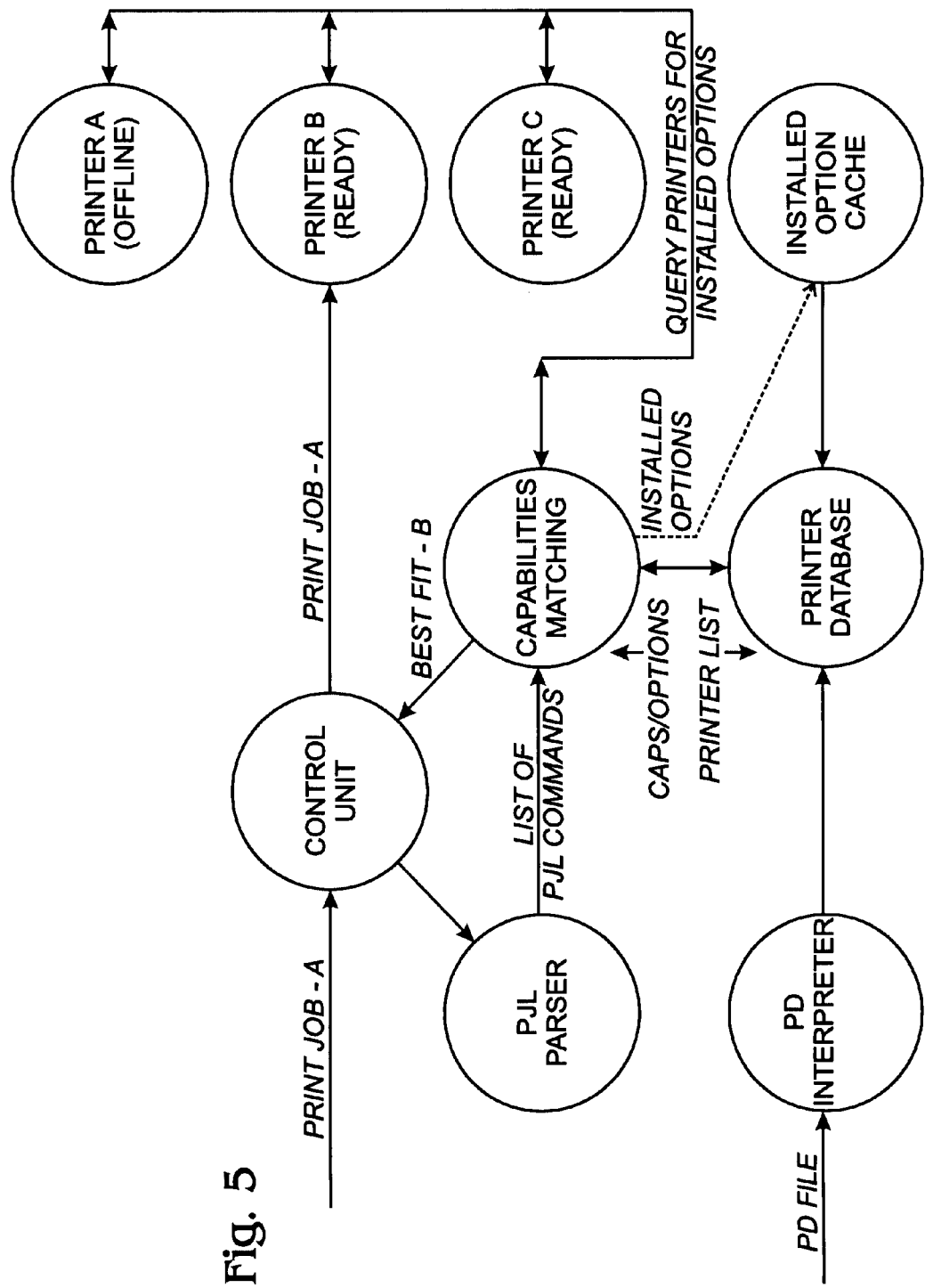
FIG. 5 is a block/schematic diagram illustrating Imaging Capabilities Matching—Best Fit—Compatible (Homogeneous) Imaging Streams.

FIG. 5 illustrates this.

In another approach, the imagers in the imager group may accept different imaging data streams for specifying imaging job requirements (e.g., PJL). In this case, the control unit performs the additional action of sending the imaging job to an imaging job editor, along with the imager model name(s) of the selected imagers and the imaging job requirements. The imaging job editor then queries the imager database with the selected imager model and the imaging job requirements. The imager database thereafter returns to the imaging job editor the imaging job commands (e.g., PJL) that correspond to the imaging job requirements which are compatible with the specified imager model. The imaging job editor then edits the imaging job, in any manner, such as by replacement or by appending in an overriding manner, that transforms the imaging job to be compatible with the selected imager.

Figure 6:
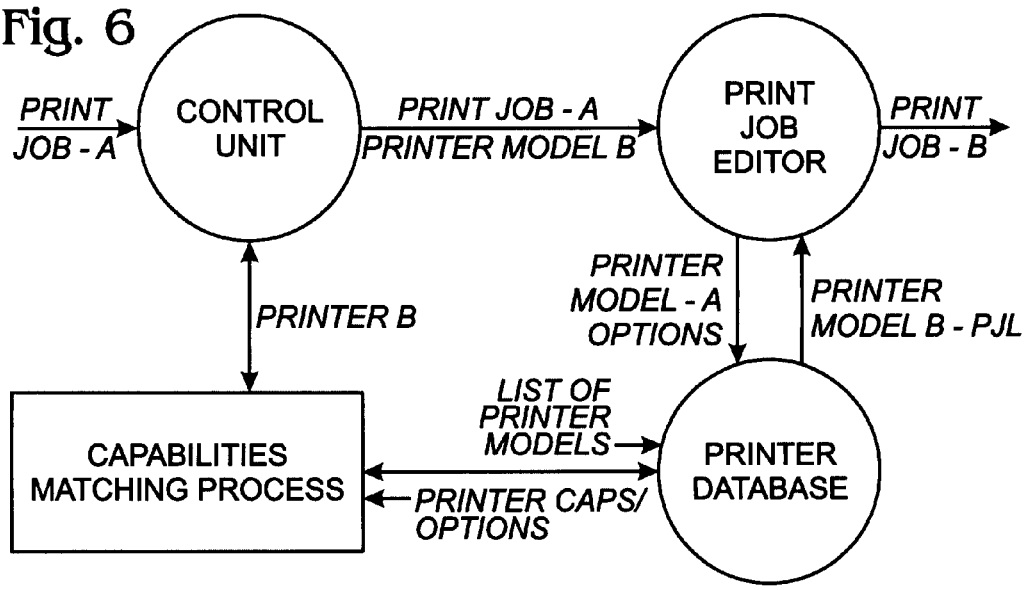
FIG. 6 illustrates a topic area referred to herein as Imaging Capabilities Matching—Best Fit (Heterogeneous) Imaging Streams.

FIG. 6 is an example of this situation.

Figure 7:
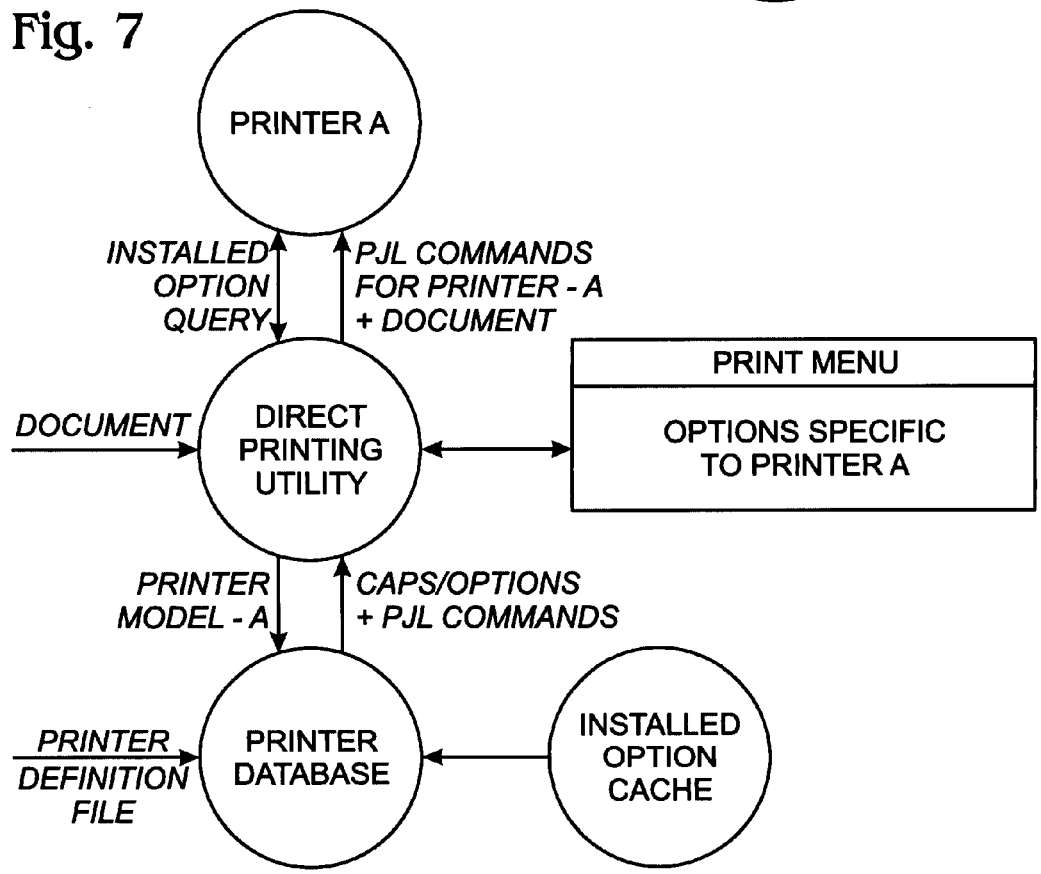
FIG. 7 illustrates the topic Virtual or Pseudo Imaging Device Driver—Direct Imaging.
Figure 8:
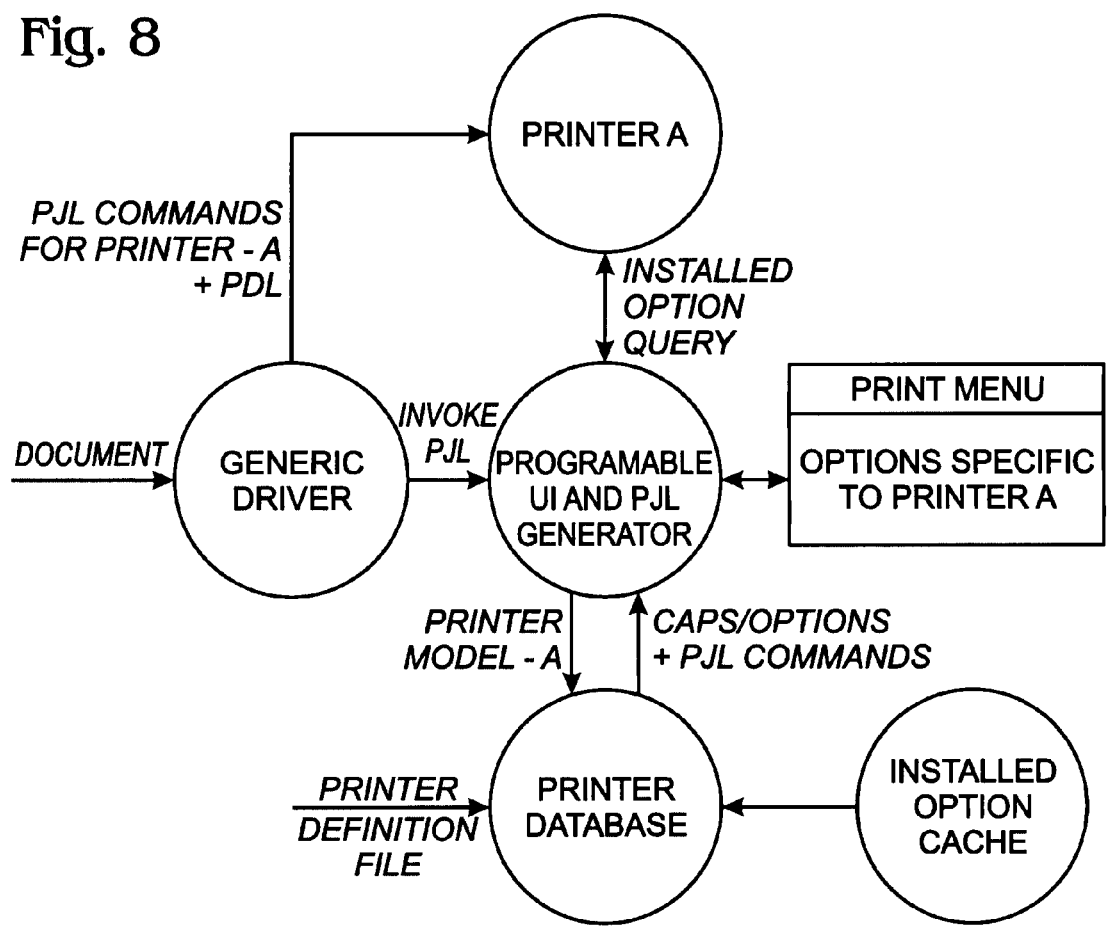
FIG. 8 illustrates a topic referred to herein as Virtual or Pseudo Imaging Device Driver—Generic Imager Driver.

In still another approach, the imager definition file is used to facilitate generating a user interface and a corresponding set of imaging job commands for a virtual or pseudo device driver, such as in a direct imaging utility (pseudo), or via a configurable generic device driver (virtual). FIGS. 7 and 8 provide illustrations regarding this area of utility of the present invention.

In one example of a direct imaging (DI) utility, the DI utility dynamically generates a user interface of imaging options that correspond to the capabilities of the selected imager by querying an imager database which is generated from an imager definition file. As suggested earlier, the DI utility can query the imager for installed capabilities using protocols specified by the imager definition file, or it can obtain the installed options via a cache from an earlier query. A user would then select the desired options from the dynamically generated user interface. The DI utility would thereafter query the imager database to obtain the imaging job commands (e.g. PJL) for the selected options that correspond to the imager model of the selected imager. The DI utility would then construct an imaging job by any suitable conventional means that conforms to the imaging device.

In another illustration, an imaging job request is submitted through a non-user interface, such as a background process; whereby, the imaging job requirements are stated in some intermediate format, and then converted to imaging job commands specific to the selected imaging device.

With respect to a generic imager driver, the generic imager driver typically contains a programmable unit that dynamically generates a user interface which furnishes imaging options that correspond to the capabilities of a selected imager. This "furnishing" is based upon querying of an imager database that is generated from an imager definition file. As in the cases discussed above, the generic imager driver can query the imager for installed capabilities using protocols specified by the imager definition file, or it can obtain the installed options via a cache from an earlier query.

A user would then select the desired options from the dynamically generated user interface. The programmable unit of the generic imager driver would then query the imager database to obtain the imaging job commands (e.g. PJL) for the selected options that correspond to the imager model of the selected imager, then passing the respective PJL commands back to the generic imager driver. The generic imager driver would then proceed to construct an imaging job in any conventional manner that conforms to the imaging device; whereby the subject imaging job will consist of the generated PDL data (e.g., PCL, Postscript, PDF, etc.) and the appropriate job commands for rendering, assembling and finishing.

In yet another form, an imaging job request may be submitted through a non-user interface, such as a background process; whereby, the imaging job requirements are stated in some intermediate format, and then converted to imaging job commands specific to the imaging device, as in the manner described above.

Figure 9:
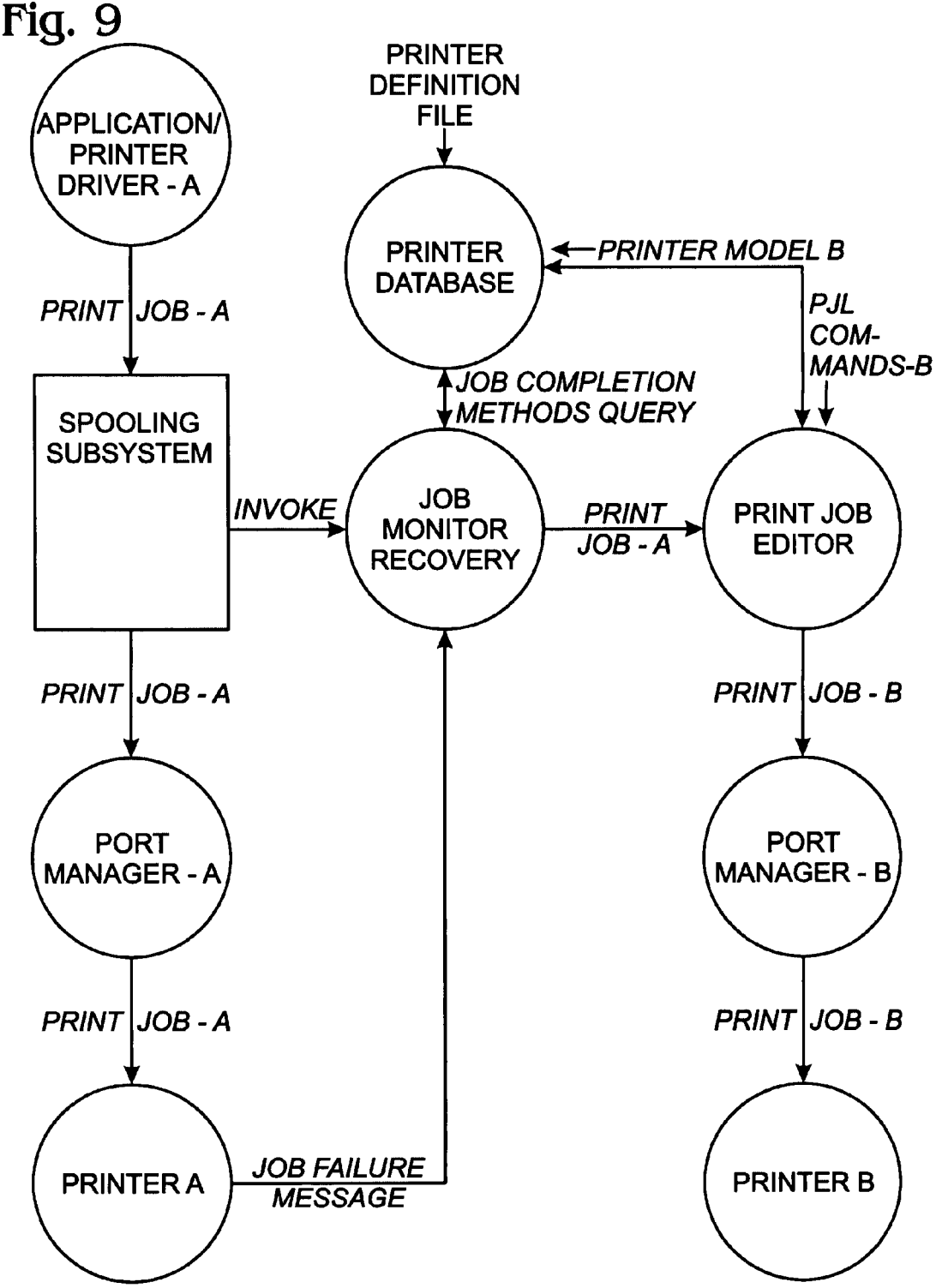
FIGS. 9 and 10 give two different illustrations referred to as Imaging-Job Error Recovery—Re-Start Job on a Compatible Imager.
Figure 10:
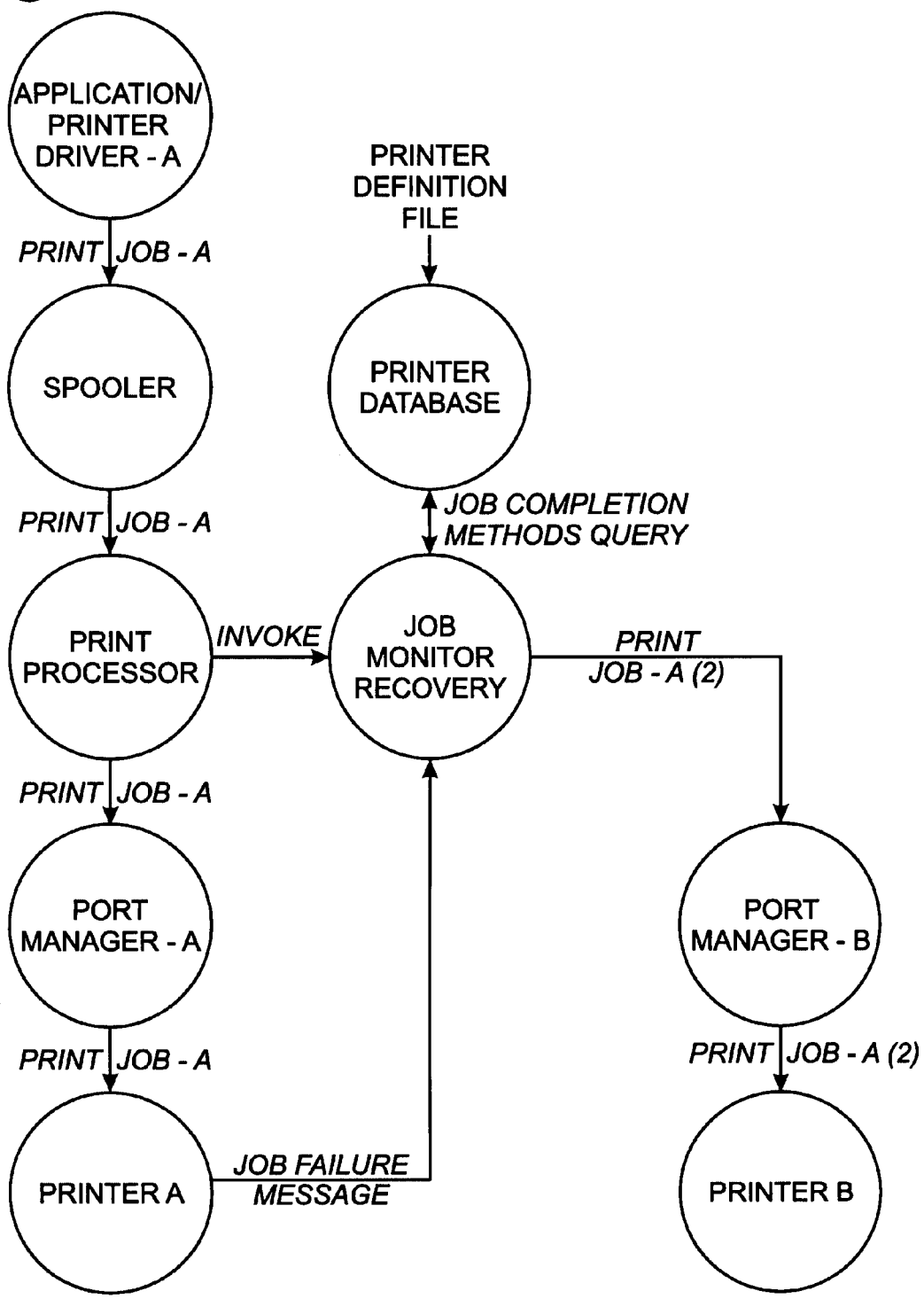

FIGS. 9 and 10 herein help to illustrate one final area for discussion regarding the present invention's flexibility and utility. Here what is shown is how the imager definition file can be used to facilitate recovering a failed imaging job.

In one example of an imaging job recovery, an imaging job is spooled to the spooler. The imaging job may be generated by an imager driver, by a direct imaging utility, by a configurable generic driver, or by some other process. In this example, a component of the spooling subsystem has the capability to monitor the successful completion of an imaging job, and additionally, the ability to restart the imaging job on another device in a setting where the available devices are either homogeneous (i.e., compatible with the same imaging stream), or heterogeneous (i.e., not compatible with the same imaging stream). The useful component in the associated imaging subsystem could be, among other things, the spooler, an imaging processor, a port monitor or an imaging assist; where, an imaging assist is any custom component added to the imaging subsystem between the imager driver (or source) and the port manager.

Once an imaging job is spooled, the component of the spooling subsystem possessing the requisite capability (e.g., an imaging processor) invokes an imaging job recovery unit (JRU). The JRU queries an imager database generated from the imager definition file to obtain the methods by which the specified imager, via its imager model (e.g., obtained by a SNMP), communicates the completion of an imaging job (e.g., de-spool, RIP, output). The JRU then instantiates a monitoring process according to the methods associated with the imaging device, and notifies the component of the spooling subsystem that the JRU is ready to monitor the job. The spooling subsystem then de-spools the imaging job to the imaging device.

If the imaging device is successful, a message is received by the JRU which informs the spooling subsystem about final job completion. If unsuccessful, a failure message from the device is received by the JRU. If the failure message reports a recoverable type of failure on the same device (e.g., paper jam), the spooling subsystem and/or the user is informed in an appropriate manner (e.g., user dialog notification). If the failure is not recoverable on the device (e.g., device malfunction), the JRU restarts the imaging job on another compatible device. A new monitoring process is then set up for the device with respect to the restarted job, and the spooling subsystem is notified of the restarted job in an appropriate manner. It should be noted that the monitoring process for the second device may be different from that for the first device. Monitoring methods for the second device are obtained from the imager database as described earlier.

In still another illustration, where the second device is not compatible with the imaging stream, the JRU, in order to effect a restart, performs the additional actions of sending the imaging job to an imaging job editor, along with the imager model name(s), and the imaging job requirements. The imaging job editor then queries the imager database with the selected imager model and the imaging job requirements. The imager database returns to the imaging job editor the imaging job commands (e.g., PJL) that correspond to the imaging job requirements which are compatible with the imager model associated with the newly selected imager(s). The imaging job editor then edits the imaging job in any suitable manner, such as by replacement or by appending, in an overriding manner, information that transforms the imaging job to be compatible with the imager(s). The JRU then sends the new imaging job to the new imager(s). The job is monitored, and the spooling subsystem notified as in the manners described above.

The system and methodology of the invention thus offer very versatile and easily implemented ways to control appropriate data association with all sorts of imaging jobs, with respect to how job-handling requirements can be effectively "translated" into the most appropriate command set(s) which is/are matchingly relevant to and compatible with different potentially available imaging devices. Certain variations and modifications also have been suggested. Accordingly, it is understood that many and other modifications and variations may be made and found to be useful, and all such other modifications and variations are deemed to be encompassed by the scope of the present invention.

I claim:

1. A computer-based, imaging-job handling method for use in a heterogeneous imaging environment having plural, different-characteristics imaging devices, and where each imaging job has the usual pre-created header which can be examined to determine the nature of the underlying job requirements, said method comprising examining the pre-created header of an imaging job to assess associated imaging-capabilities requirements of the job which underlie information contained in the header, and where necessary to produce compatibility between the imaging job with respect to its underlying requirements and an available imaging device in the environment having compatible-characteristics relative to such underlying requirements, re-writing the header to establish therein a data structure which substantially expresses the job's associated imaging-capabilities requirements in a manner focusedly linked with such available, compatible-characteristics imaging device.

2. The method of claim 1, with respect to which the mentioned imaging job includes any one of (a) a printing job, (b) a faxing job, (c) a scanning job, (d) a copying job, (e) a document archiving/retrieving job, (t) a document converting/manipulating job, (g) a document transferring job, and (h) a device managing job.

3. The method of claim 1, wherein the imaging-job header, in its pre-assessment condition, contains data structure which links the job's imaging-capabilities requirements with an imaging device which is not currently available in the environment, and said examining to assess is performed (a) by first reverse-engineering the header to characterize the job's imaging-capabilities requirements in a non-imaging-device-specific data-structure manner, (b) matching that non-imaging-device-specific data-structure characterization to an imaging-job header data structure which is specific to a compatible-characteristics imaging device in the environment which is currently available, and (c) re-writing the imaging-job header accordingly.

4. The method of claim 3, wherein said matching is performed utilizing a look-up table type approach that relates non-imaging-device-specific expressions of imaging-capabilities characteristics to different, generally environment-available, expressions of such capabilities which are respectively specific to different imaging devices that are part of the imaging environment.

5. The method of claim 4, wherein the mentioned expressions take the form of imaging-device driver definitions.

6. The method of claim 1, wherein said examining step is performed downstream from an imaging-job generator which forms part of the imaging environment, and which has been responsible for the creation of at least a part of the pre-assessment, imaging-job header.

7. A dynamic, computer-based, imaging-job handling method for use in a heterogeneous imaging environment having plural, different-characteristics imaging devices, and where each imaging job has the usual pre-created header which can be examined to determine the nature of the underlying job requirements, said method comprising examining the pre-created header of an imaging job to assess the associated imaging-capabilities requirements of the job, as a part of said assessing, taking onto account matters including any one or more of (a) imaging options, (b) a pseudo driver, (c) imaging-device firmware, (d) imaging-device driver attributes, (e) communication protocols for de-spooling, and (f) whether or not imaging options are installable, and dynamically assuring compatibility between the imaging job with respect to its underlying requirements and an available imaging device in the environment having compatible-characteristics relative to such underlying requirements, by positively associating with the imaging job appropriate job-specific data structure which takes (a), (b), (c), (d), (e) and (f) into account.

8. A computer-based system for enabling, in a heterogeneous imaging environment wherein there are plural, different-characteristics imaging devices, the handling by a compatible imaging device of an imaging job possessing an imaging-job header which contains data structure that links the job's underlying imaging-capabilities requirements with certain characteristics of a specific imaging device, said system comprising first structure constructed to examine in the system the header of a pre-created imaging job presented to the system, thus to assess the associated imaging-capabilities requirements of the job which underlie information contained in the header, and second structure operatively connected to said first structure, operable, following an assessment which has been performed by said first structure, and under circumstances where it is necessary to produce compatibility between the imaging job and an available, imaging device in the system having compatible-characteristics relative to such underlying requirements, to re-write the examined imaging-job header, thus to establish therein a data structure which substantially expresses the job's associated, imaging-capabilities requirements in a manner focussedly linked with such an available, compatible-characteristics imaging device.

9. The system of claim 8 which further includes third structure operatively connected to said first and second structures, and taking the form generally of a look-up table that relates non-imaging-device-specific expressions of imaging-capabilities characteristics to different, generally environment-available expressions of such capabilities which are respectively specific to different imaging devices that are part of the imaging environment.

* * * * *